US006883815B2

(12) United States Patent
Archer

(10) Patent No.: US 6,883,815 B2
(45) Date of Patent: Apr. 26, 2005

(54) FIRE-FIGHTING VEHICLE

(75) Inventor: David W. Archer, Hortonville, WI (US)

(73) Assignee: Oshkosh Truck Corporation, Oshkosh, WI (US)

( * ) Notice: Subject to any disclaimer, the term of this patent is extended or adjusted under 35 U.S.C. 154(b) by 0 days.

(21) Appl. No.: 10/171,076

(22) Filed: Jun. 13, 2002

(65) Prior Publication Data

US 2003/0230863 A1 Dec. 18, 2003

(51) Int. Cl.[7] .................................................. B60D 7/04
(52) U.S. Cl. ................................... 280/91.1; 180/24.01
(58) Field of Search ......................... 280/91.1, 99, 103; 180/24.01, 408–410, 412, 414

(56) References Cited

U.S. PATENT DOCUMENTS

| | | | | | |
|---|---|---|---|---|---|
| 4,185,712 | A | | 1/1980 | Bulger | 180/131 |
| 4,582,334 | A | | 4/1986 | Tashiro et al. | 280/91 |
| 4,592,561 | A | | 6/1986 | Furukawa et al. | 280/91 |
| 4,669,744 | A | * | 6/1987 | Sano et al. | 180/412 |
| 4,926,954 | A | * | 5/1990 | Ataka et al. | 180/412 |
| 4,968,080 | A | | 11/1990 | Kerry | 294/81.2 |
| 5,010,971 | A | * | 4/1991 | Hamada et al. | 180/412 |
| 5,076,597 | A | * | 12/1991 | Korekane et al. | 180/409 |
| 5,111,901 | A | | 5/1992 | Bachhuber et al. | 180/140 |
| 5,137,292 | A | * | 8/1992 | Eisen | 180/415 |
| 5,217,083 | A | | 6/1993 | Bachhuber et al. | 180/140 |
| 5,225,983 | A | | 7/1993 | Ohmura et al. | 364/424.05 |
| 5,307,891 | A | * | 5/1994 | Shaw et al. | 180/400 |
| 5,390,945 | A | * | 2/1995 | Orr | 280/81.5 |
| 5,417,299 | A | | 5/1995 | Pillar et al. | 180/140 |
| 5,501,288 | A | * | 3/1996 | Ducote | 180/24.01 |
| 5,533,584 | A | | 7/1996 | Johnson | 180/415 |
| 5,538,274 | A | | 7/1996 | Schmitz et al. | 280/666 |
| 5,607,028 | A | | 3/1997 | Braun et al. | 180/408 |
| 5,820,150 | A | | 10/1998 | Archer et al. | 280/124.138 |
| 6,086,074 | A | | 7/2000 | Braun | 280/89.11 |
| 6,615,944 | B1 | * | 9/2003 | Horwath et al. | 180/204 |

OTHER PUBLICATIONS

U.S. Department of Transportation, Federal Aviation Administration, Guide Specification for Water/Foam Aircraft Rescue and Fire Fighting Vehicles, Feb. 18, 2002.*

* cited by examiner

*Primary Examiner*—Eric Culbreth
(74) *Attorney, Agent, or Firm*—Foley & Lardner LLP

(57) ABSTRACT

An airport rescue fire-fighting vehicle comprising a support structure coupled to at least two wheel sets. The support structure has a front end and a back end with one wheel set coupled to the front end of the support structure and one wheel set coupled to the back end of the support structure. A power source is mounted on the support structure and coupled to at least one wheel set. Each wheel of the vehicle is coupled to a modular independent suspension. A mechanical steering apparatus is coupled to the front wheel set and at least one rear wheel set.

21 Claims, 7 Drawing Sheets

FIRE-FIGHTING VEHICLE

BACKGROUND OF THE INVENTION

This invention relates to vehicles in general and particularly to fire-fighting type work vehicles and specifically to an airport rescue fire-fighting vehicle.

Prior art vehicles, specifically fire-fighting type of vehicles have a variety of equipment and apparatus utilized during fire-fighting and rescue operations. Typical fire-fighting vehicles provide for only front wheel steer capability. Specialized vehicles such as extension ladder fire trucks may provide for rear wheel steer; however, those typically require an operator sitting in a rear cabin to turn the rear wheel set in an independent linkage from the front wheel steering apparatus. Other steering configurations include all wheel steer systems such as disclosed in U.S. Pat. No. 5,607,028 assigned to the present assignee. Such all wheel steering system utilizes a programmable controller and typically is utilized on heavy-duty vehicles such as equipment haulers and construction equipment. One problem experienced by vehicles not being capable of rear steering is excessive tire wear on the rear set of wheels. There is a need for an apparatus that will minimize or eliminate excessive tire wear on the rear or back wheel set for fire-fighting vehicle.

Fire-fighting vehicles, and particularly airport rescue fire-fighting vehicles have to comply with several standards with respect to stability. The Federal Aviation Administration (FAA) and the National Fire Protection Agency (NFPA) have published certain documents which set out standards and requirements that must be met by all airport rescue fire-fighting vehicles. One such requirement is that a tilt-table capability for fire-fighting vehicles be at least 30°. The agencies also adopted requirements that the fire-fighting vehicles meet the NATO lane change test and a dynamic turning circle test at 28 m.p.h. Compliance with such standards and meeting such tests would, as determined by the FAA and NFPA provide a stable platform for the fire-fighting vehicle. Thus, there is a need for a fire-fighting vehicle, and particularly an airport rescue fire-fighting vehicle to comply with the requirements as established by the FAA and NFPA.

SUMMARY OF THE INVENTION

There is provided an airport rescue fire-fighting vehicle comprising a support structure coupled to at least three wheel sets. The support structure has a front end and a back end with one wheel set coupled to the front end of the support structure and one wheel set coupled to the back end of the support structure. A power source is mounted on the support structure and coupled to at least one wheel set. Each wheel of the vehicle is coupled to a modular independent suspension. A mechanical steering apparatus is coupled to the front wheel set and at least one rear wheel set, with the mechanical steering apparatus configured to minimize tire scrub on the rear wheel seat. Another embodiment of the airport rescue fire-fighting vehicle includes a steering wheel coupled to a first parallel shaft gear box. A front master/slave steering gear set and an elongated rotary shaft is also coupled to the first parallel shaft gear box. A second parallel shaft gear box is coupled to the elongated rotary shaft and is coupled to a back master/slave steering gear set. The front master/slave steering gear set is coupled to the front wheel set and the back master/slave steering gear set is coupled to the rear wheel set so that when the front wheel set is turned in one direction the rear wheel set will turn in a proportional opposite direction in response to the steering wheel movement.

There is also provided a mechanical steering apparatus for an airport rescue fire-fighting vehicle. The airport rescue fire-fighting vehicle has a front wheel set, and at least two wheel sets. A modular independent suspension is coupled to each wheel of each wheel set. The mechanical steering apparatus comprises a steering wheel mounted on the vehicle. A first parallel shaft gear box is coupled to the steering wheel, a front master/slave steering gear set and an elongated rotary shaft. A second parallel shaft gear box is coupled to the elongated rotary shaft and is coupled to a back master/slave steering gear set. The front master/slave steering gear set is coupled to the front wheel set and the back master/slave steering gear set is coupled to one of the rear wheel sets so that when the front wheel set is turned in one direction, the rear wheel set will turn in a proportional opposite direction in response to the steering wheel movement and minimize tire scub on the rear wheel set. In another embodiment, the elongated rotary shaft can be segmented.

There is further provided a fire-fighting vehicle comprising a means for supporting coupled to at least three wheel sets. The means for supporting has a front end and a back end wherein one wheel set is coupled to the front end of the means for supporting and one wheel set is coupled to the back end of the means for supporting. A means for powering is mounted on the means for supporting and is coupled to at least one wheel set. A modular independent suspension is coupled to each wheel. A means for mechanically steering is coupled to the front wheel set and at least one rear wheel set, with the means for mechanically steering configured to minimize tire scrub on the rear wheel set. Another embodiment includes a means for steering, a first means for transferring torque coupled to the means for steering, a front means for wheel steering and an elongated rotary shaft. A second means for transferring torque is coupled to the elongated rotary shaft and is coupled to a back means for wheel steering. The front means for wheel steering is coupled to the front wheel set and the back means for wheel steering is coupled to the rear wheel set so that when the front wheel set is turned in one direction, the rear wheel set will turn in a proportional opposite direction in response to movement of the means for steering.

DETAILED DESCRIPTION OF THE EXEMPLARY EMBODIMENTS

Figure 1:
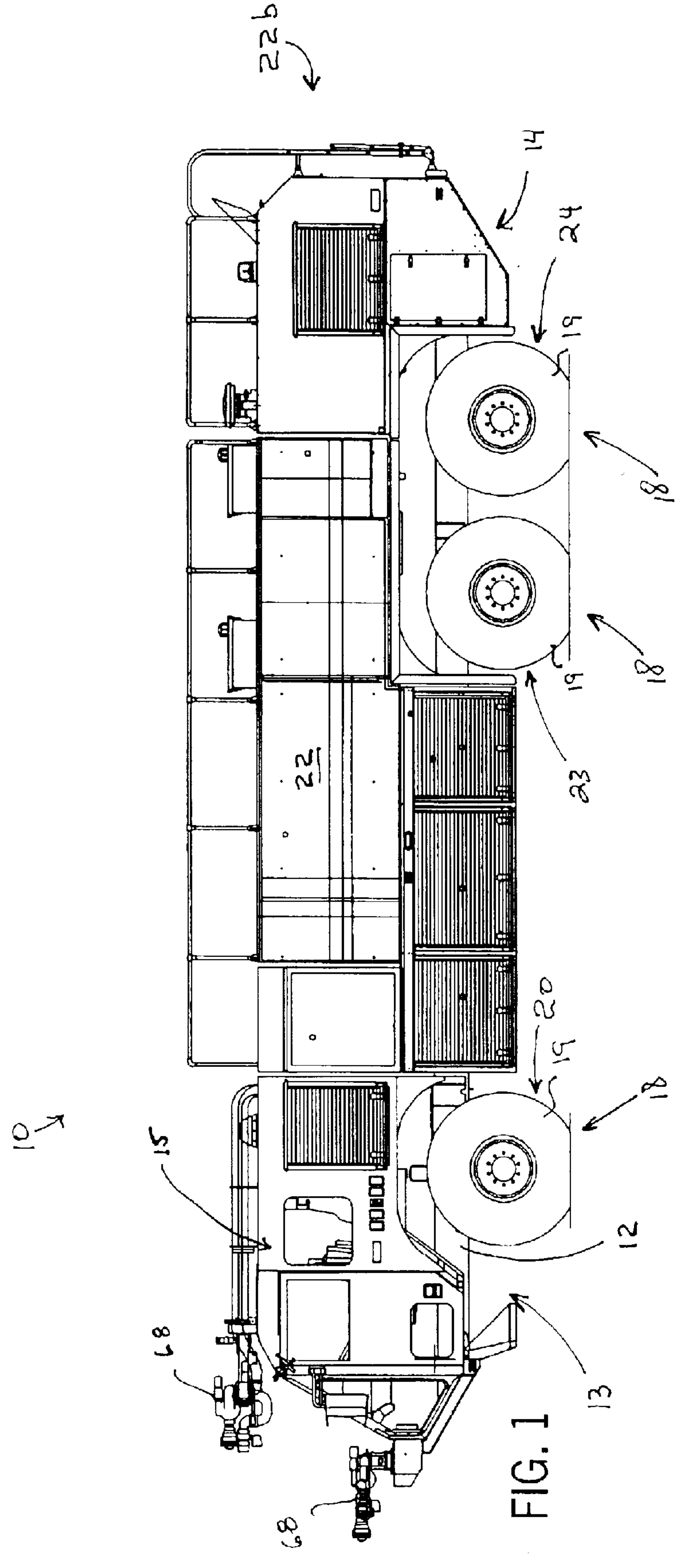
FIG. 1 is a plan side view of an embodiment of an airport rescue fire-fighting vehicle having a mechanical steering mechanism.

Before discussing an exemplary embodiment of a fire-fighting vehicle 10, there are a few preliminary comments. When referring to a work vehicle 10, it is contemplated that a vehicle 10 can be of several different uses and it is referred to as a work vehicle, a fire-fighting vehicle 10, a crash truck 10, a multi-wheel vehicle 10 and the like. It is also contemplated that articulated tracks mounted on the wheels can be used as support for the support structure 12 of the vehicle 10. The vehicle 10 also typically has an area designated as a vehicle body 22, a cab 15, a vehicle side 22*a* (typically two sides) and a rear 22*b*. It is contemplated that any convenient and conventional materials can be utilized for such vehicle portions commensurate with the type duty that will be experienced by the vehicle. For example, the body can be made out of steel, aluminum, or a composite material. The wheels 19 can be cast or machined. The wheel arrangements can be four-wheel, six-wheel (two tandem wheel sets at the rear of the vehicle as illustrated in FIG. 1) and eight-wheel vehicle.

A fluid source can be mounted directly on the fire-fighting vehicle 10, can be towed on a separate trailer structure or can be a fixed fluid source such as lake, river or tank. For example if the fire-fighting vehicle 10 is configured as a airport rescue fire-fighting vehicle, the fluid source is typically mounted on the vehicle 10, or the vehicle 10 can be brought to an independent fluid source which then utilizes the vehicle for pumping purposes.

As discussed above, the work vehicle 10 can be a fire truck or crash truck. For this application, fire truck means a municipal fire truck equipped to fight structural building fires and typically is not considered an off-road vehicle. For this application, a crash truck means an airport rescue fire-fighting vehicle equipped to fight aircraft fires and fuel fires. The crash truck is configured for off-road use. A typical application for a fire-fighting or crash truck utilized at an airport is for it to be called upon in the event of an airplane crash at or near the airport.

Referring now to the Figures, FIG. 1 illustrates an airport rescue fire-fighting type vehicle. The vehicle is configured with at least two tandem wheel sets 18, which includes a front wheel set 20, and a rear or back wheel set 24. The vehicle can also have an intermediate wheel set 23 as shown in FIG. 1. The vehicle includes a support structure 12 having a front end 13 and a back end 14 (see FIGS. 1 and 6). One of the wheel sets 18 is coupled to the front end 13 of the support structure 12 and at least one wheel set 18 is coupled to the back end 14 of the support structure 12. A power source 16 is mounted on the support structure 12 and is coupled to at least one of the wheel sets 18. It should be noted that the power source 16 can be a hybrid-electric system an internal combustion engine, such as a gasoline or a diesel engine or a turbine engine or the like. It should also be understood that the power source 16 can be coupled to more than one wheel set 18 and can include an all-wheel drive vehicle.

Each wheel 19 is coupled to a modular independent suspension 26. (See FIGS. 2 and 4). The modular independent suspension 26 includes a coil spring suspension for steerable and non-steerable wheel assemblies and drive and non-drive axles. The modular independent suspension 26 is coupled to the support structure 12 and to each wheel assembly of the fire-fighting vehicle 10. An example of such modular independent suspension 26 is more fully described in U.S. Pat. Nos. 5,538,274 and 5,820,150 commonly assigned to the assignee of the present application. Such disclosures are incorporated herein by this reference.

Figure 5:
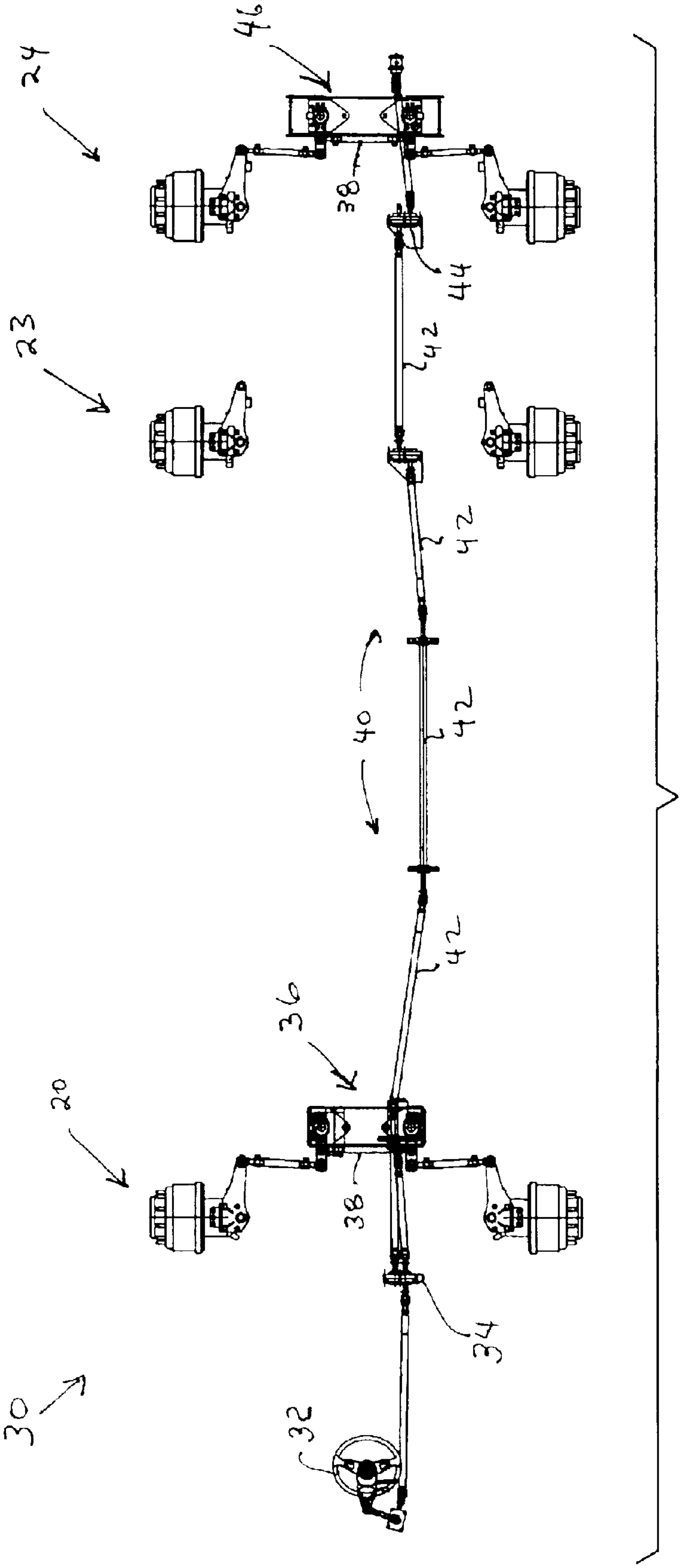
FIG. 5 is a top perspective view of an embodiment of a mechanical steering apparatus coupling a back wheel set to a front wheel set and a steering wheel of an airport rescue fire-fighting vehicle, with the back wheel set aligned with the front wheel set for straight travel.

The airport rescue fire-fighting vehicle 10 also includes a mechanical steering apparatus 30 coupled to the front wheel set 20 and at least one of the rear wheel sets 24, typically the rear-most wheel set 18. (See FIGS. 5 and 6)

The mechanical steering apparatus 30 includes a steering wheel 32 and a first parallel shaft gear box 34 coupled to the steering wheel, a front master/slave steering gear set and an elongated rotary shaft 40. A second parallel shaft gear box 44 is coupled to the elongated rotary shaft 40 and is coupled to a back master/slave steering gear set 46. The front master/slave steering gear set is 36 is coupled to the front wheel set 20 and the back master/slave steering gear set 46 is coupled to the rear wheel set 24 so that when the front wheel set 20 is turned in one direction the rear wheel set 24 will turn in a proportional opposite direction in response to the steering wheel 32 movement. (See FIGS. 5 and 6.)

Each master/slave steering gear set 36, 46 consists of a master steering gear and a slave steering gear which are coupled together by a tie rod 38 and mounted to the support structure 12 by any convenient and conventional manner such as bolting or welding. Each steering gear is coupled to a steerable wheel utilizing a toe control linkage in any convenient manner. Likewise, the rear master gear and slave gear set are coupled together by a tie rod 38 and mounted on the support structure 12 in any convenient manner, such as bolting or welding. Each gear set is coupled to a steerable wheel by a toe control arm in any convenient manner.

The front master/slave steering gear set 36 and the back master/slave steering gear set 46 are coupled together by the elongated rotary shaft 40. As shown in the figures, the elongated rotary shaft 40 can include several segments 42. The segments 42 are coupled together in any convenient and conventional manner such as utilizing universal joints. The rotary shaft 40 is mounted on the support structure 12 with torque being transferred between the various components by a plurality of parallel shaft gear boxes 34, 44. The first parallel shaft gear box 34 and a second parallel shaft gear box 44 are illustrated in the figures. It should be understood however, that additional parallel shaft gear boxes can be utilized to transfer torque from one component to another as part of the mechanical steer apparatus 30. The steering wheel 32 is mounted in the cab 15.

Figure 6:
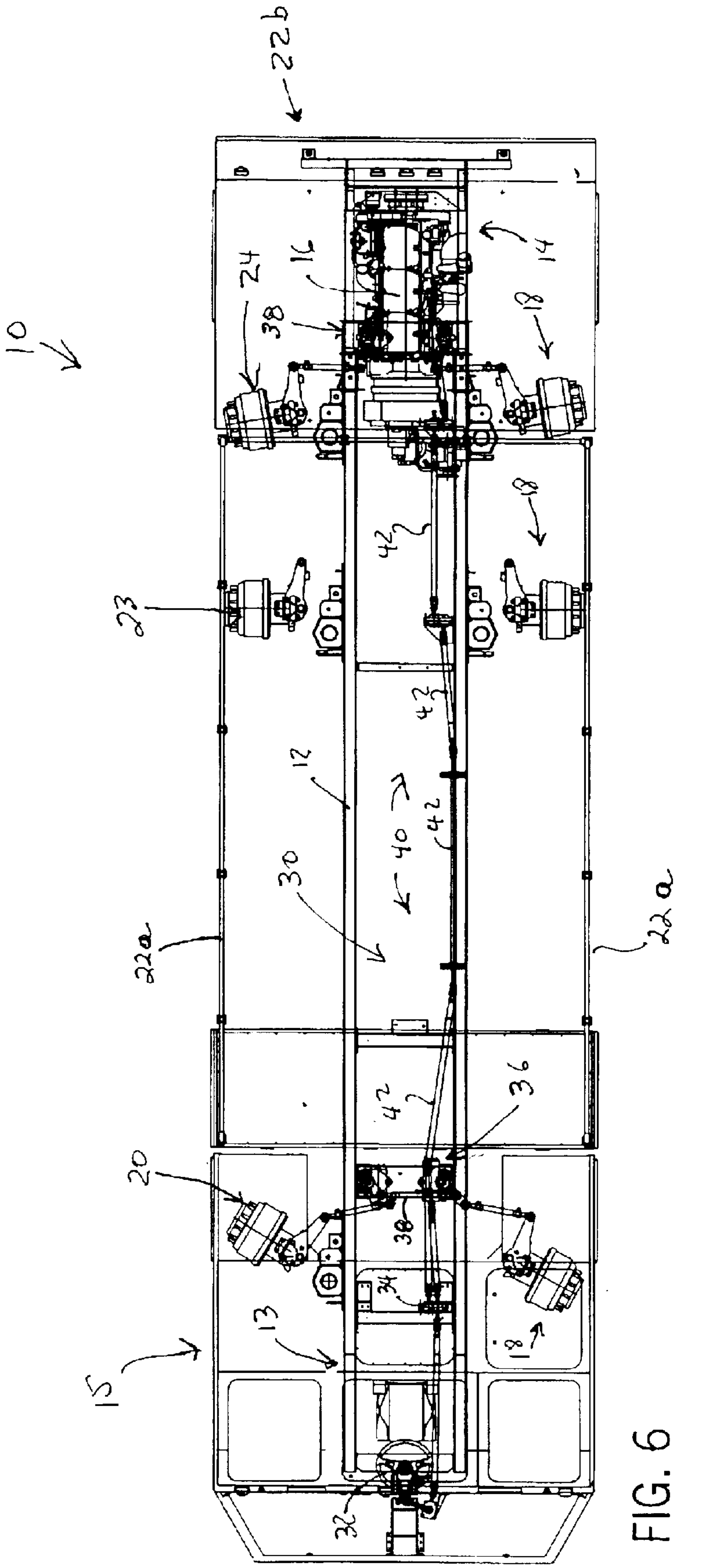
FIG. 6 is a partial top perspective view of an embodiment of the mechanical steering apparatus for an airport rescue fire-fighting vehicle mounted on a support structure of the vehicle, with the front wheel set in a full right turn and the back wheel set in a proportional opposite direction turn in response to the steering wheel movement.

As shown in FIGS. 1 and 6, the fire-fighting vehicle 10 is shrouded by a vehicle body 22. The vehicle body encloses the principal pieces of equipment of the fire-fighting vehicle 10 such as the power source 16, the mechanical steer apparatus 30 and the several fluid tanks (not shown) that are mounted on the support structure 12. Typical fluid tanks include a water tank and a chemical agent tank. Such tanks are coupled to selected fire-fighting equipment 68 such as bumper mounted nozzles or boom mounted nozzles.

One advantage of the present fire-fighting vehicle is its stability. The fire-fighting vehicle 10 is configured to be as low and wide as possible. It has been determined that due primarily to garage door widths, operator visibility requirements and maneuverability, the widest width of the vehicle should not exceed 120 inches. Such 120 inch width is measured on the overall width of the vehicle body 22 from side 22*a* to side 22*a*. It should be noted, however, that extraneous items such as mirrors and door handles were allowed to set out past the 120 inch width without affecting the stability of the vehicle. Within the constraint of the 120 inch width, the various components and equipment mounted on the fire-fighting vehicle 10 was spread out and lowered as much as possible. For example, the water tank center of gravity was moved down as a result of the widening of the vehicle. The vehicle was also configured to move large volume, low density items up and large volume, high density items down within the constraints of the vehicle overall width. For example, the power source 16 was moved down within the frame and air reservoirs were moved out of the frame support structure 12. For a hybrid-electric system powered vehicle 10, the power source 16 is proximate each wheel. Such configuration lowers the center of gravity even further. The net effect of these various design configurations move the overall center of gravity C.G. of the vehicle down from previous configurations thereby increasing stability.

Figure 2:
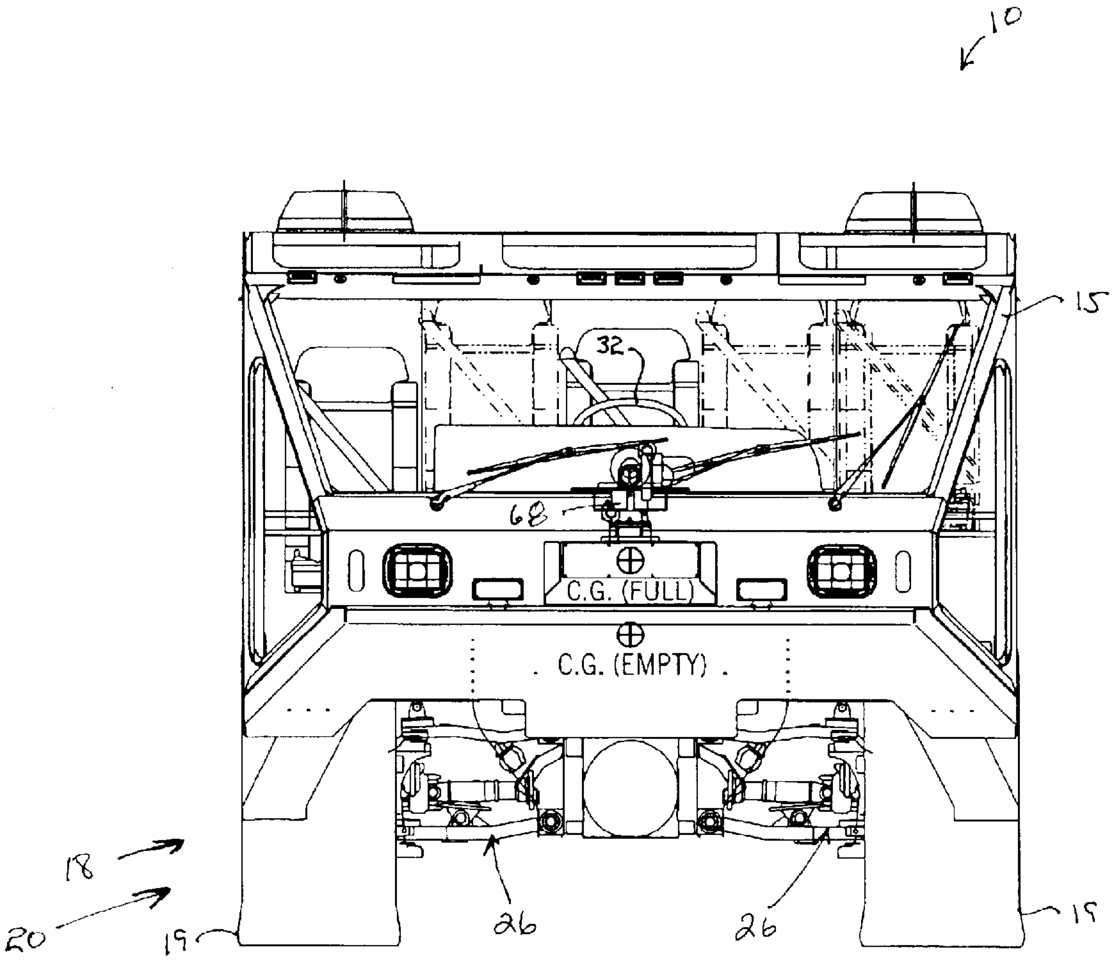
FIG. 2 is a front view of the airport rescue fire-fighting vehicle illustrated in FIG. 1, illustrating the center of gravity when the vehicle is empty of fire-fighting fluids and when the vehicle has a full load of fire-fighting fluids.

FIG. 2 illustrates an airport rescue fire-fighting vehicle 10 which illustrates a center of gravity C.G. when the vehicle is empty and the center of gravity C.G. when the vehicle is full. It is noted that the center of gravity when full, is actually higher than the center of gravity when the vehicle is empty. The reference to full and empty is to the fire-fighting fluid tanks which account for the largest variable weight distribution on the fire-fighting vehicle 10. The weight of the water primarily accounts for the largest shift of the center of gravity in an upward direction. Notwithstanding that phenomena, the center of gravity of the present fire-fighting vehicle 10 is lower than the center of gravity of prior art airport rescue fire-fighting vehicles. It is the relationship of the width of the vehicle at the ground vs. the height of the center of gravity that affects the stability of the vehicle during its maneuvers.

To confirm the stability of the vehicle, a tilt-table capability test is typically required for airport rescue fire-fighting vehicles to comply with the FAA and NFPA Standards as discussed above. The tilt-table evaluation is a test performed to quantify the static stability of a vehicle. The test performed is typically done in accordance with standard SAE J 2180. The point at which a vehicle becomes unstable is defined as a point in which at least all axles have been lifted off a test table except the front of the vehicle. At this point, the test table movement is stopped and the test table angle is recorded. The lateral acceleration required to tip the vehicle over can then be calculated based on the resulting table angle. This measurement is only an estimation of the lateral acceleration needed to tip a vehicle and a dynamic response due to dynamic variables such as road surface, vehicle condition and pay load variations. However, a benchmark database can be generated and used as a comprehensive value between vehicles.

Other factors contributing to vehicle roll are lateral and vertical tire stiffness, suspension roll stiffness, center of gravity height, and overall width of the vehicle. The relationship of the height and width are the most fundamental and significant to roll stability of a vehicle. As the vehicle width is increased and the center of gravity height is lowered, the vehicle naturally becomes more stable with all other factors being equal. This is due to the fact that the overturning moment of the vehicle does not generate until the location of the center of gravity, and the vertical plane is moved outside the pivot point P.P. of the vehicle at the tire ground interface. At this point, the lateral acceleration will have the ability to turn the vehicle over.

The suspension system for the vehicle will also deflect as the lateral acceleration is increased. The downhill suspension will collapse as the uphill suspension extends. These deflections move the roll center of the vehicle, as well as, causing the center of gravity C.G. location to move towards the pivot point P.P. of the tire ground interface. Anti-roll bars are typically installed in an attempt to stiffen the suspension in roll. However, the modular independent suspension 26 as described above, also contributes to the stability of the fire-fighting vehicle 10.

Figure 3:
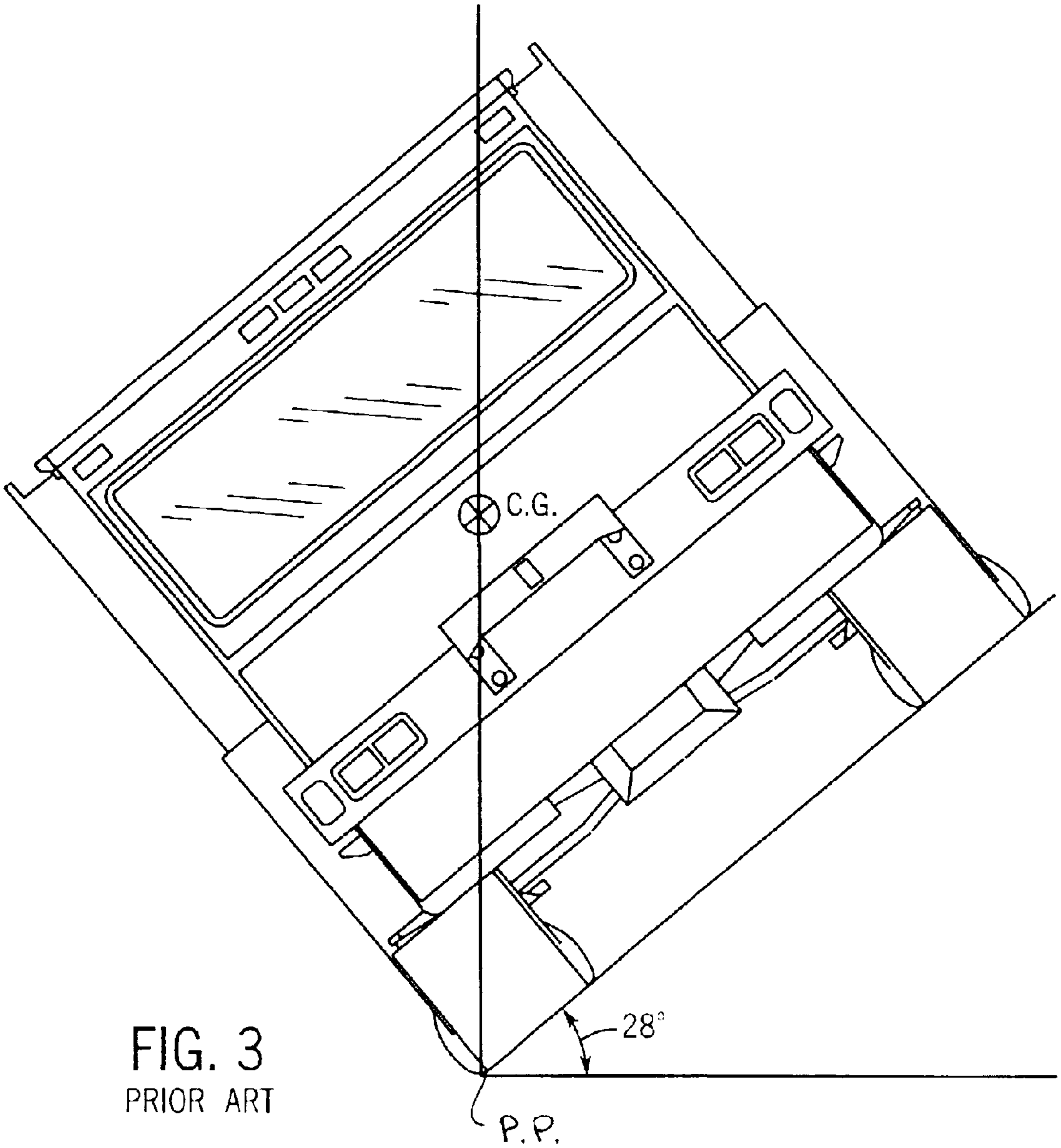
FIG. 3 PRIOR ART
FIG. 3 is a schematic illustration of a prior art fire-fighting vehicle having a maximum 28° tilt-bed capability.
Figure 4:
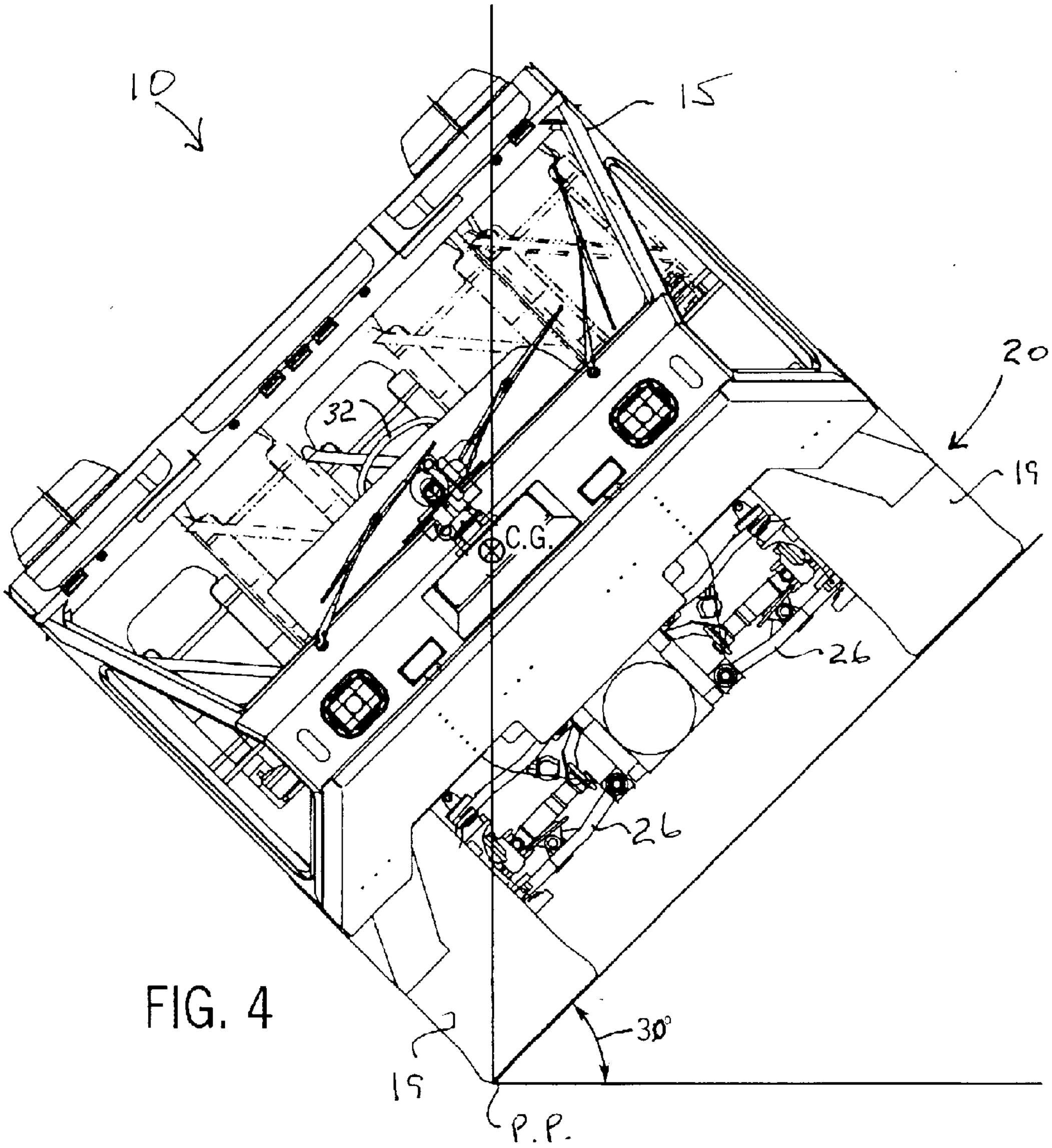
FIG. 4 is a schematic illustration of the airport rescue fire-fighting vehicle illustrated in FIGS. 1 and 2 having at least a 30° tilt-bed capability.

FIG. 3 illustrates a typical prior art vehicle illustrating the tilt-table capability which illustrates a typical tilt-table angle as described above. Lateral acceleration beyond the 28° will tip the vehicle over. In contrast, FIG. 4 depicts the tilt-table angle of the present fire-fighting vehicle 10. As can be seen, the tilt-table angle is 30° which complies with the standards established by the FAA and NFPA described above. Applicant has determined that the tilt-table capability angle can be as high as 35° without the vehicle rolling over. The illustrated three degree tilt table angle difference between prior art and the present fire-fighting vehicle 10 is significant and is attributable to the overall configuration of the fire-fighting vehicle 10.

Other factors that must be considered in the overall configuration of the fire-fighting vehicle can include an increasing in the length of the vehicle which can also reduce the center of gravity height over the surface, however, design specifications of break-over clearance and approach and departure angles (which must be at least 30° as established by the FAA and NFPA) significantly limits the vehicle length designs. It has also been determined that increasing the spring stiffness or using stiff anti-roll bars are effective only to'the point of lifting the opposite wheel off the ground. After that point, additional stiffening has no effect and in any event the stiffer the springs and roll bars the more uncomfortable the ride quality will be for the operators of the vehicle.

Figure 7A:
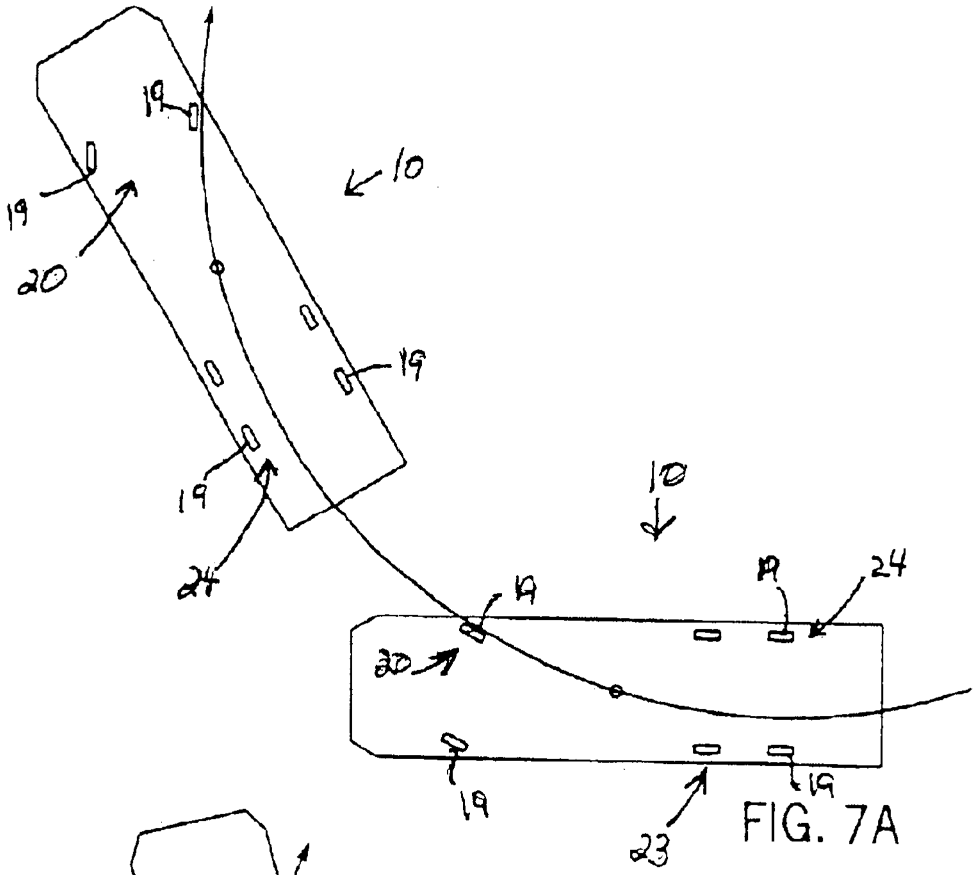
FIG. 7A PRIOR ART
FIG. 7A is a schematic view of the prior art fire-fighting vehicle not having steerable rear wheels making a right turn.
Figure 7B:
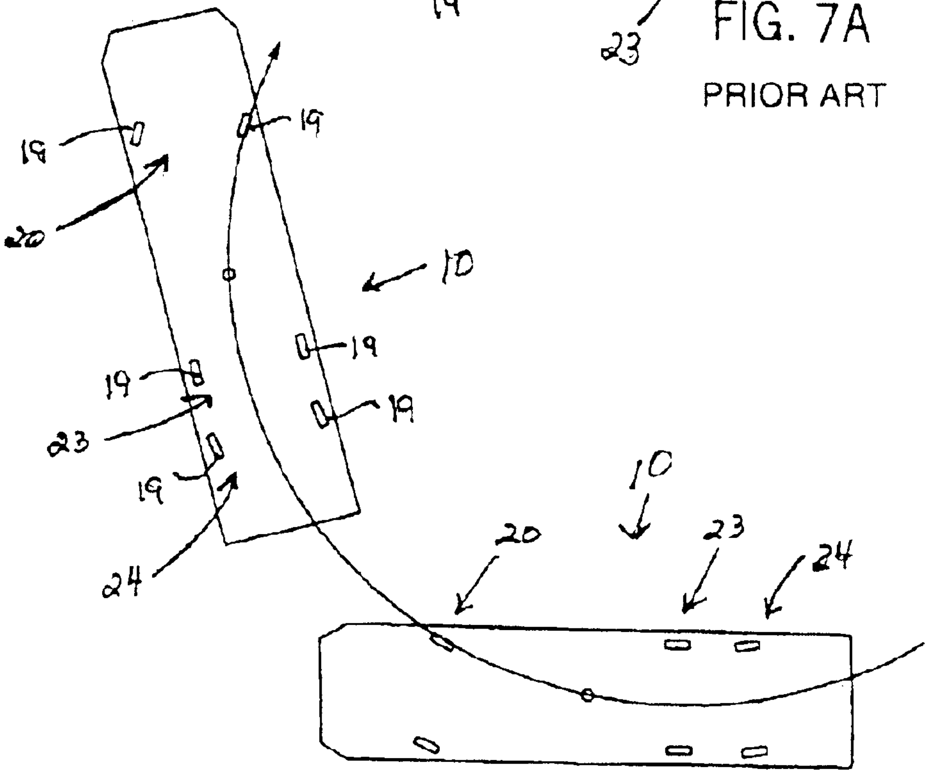
FIG. 7B is a schematic view of an embodiment of a fire-fighting vehicle having a mechanical steering apparatus with a steerable back wheel set making a right turn with a shorter radius than the vehicle illustrated in FIG. 7A.

FIGS. 7*a* and 7*b* schematically illustrate the vehicle 10 making a right hand turn with the front wheels 20 turned fully to the right. FIG. 7*a* illustrates a fire-fighting vehicle with a fixed rear wheel set 24. FIG. 7*b* illustrates a fire-fighting vehicle 10 with rear steer wheels coupled proportionately to the front wheels by the mechanical steering apparatus 30 described above. As can be seen, the vehicle in FIG. 7*b* can turn more sharply than the vehicle in 7*a* wherein the greater maneuverability is afforded to the vehicle illustrated in FIG. 7*b*. By coupling the rear wheel set 24 to the front wheel set 20, tire wear on the rear wheel set 24, wheels 19 is minimized. The tire wear known as scrub experienced by tires in the configuration as depicted in FIG. 7*a* is a result of the tires sliding as the vehicle turns. As the front wheels turn, the vehicle pivots on the fixed rear axle wheel set with the rear wheels rolling and sliding through the turn which causes the tread on the tire to wear faster than other tires on a vehicle. Tires on an airport rescue fire-fighting vehicle can exceed $1,500 each and therefore minimizing the wear on a tire is economical not only because of the cost of the tire, but also the time and expense in taking the vehicle out of service in order to replace the tire.

As illustrated in FIG. 7*b*, the fire-fighting vehicle 10 with the rear steer capability can make a sharper turn because of the reduced turning radius. In the illustration, the front wheel set 20 is turned at about 32° and the back wheel set 24 is turned a proportional opposite direction of about 6° in response to the steering wheel 32 movement. The mechanical steering apparatus 30 is balanced to provide enough steering (turn radius) in the back wheel set 24 for tracking in the turn and without too much steering angle which would cause the front wheel set 20 to slide sideways. The mechanical steering apparatus 30 allows the vehicle 10 to pivot about the center of the radius of the turn, while maintaining control of the vehicle 10 and minimizing tire scrub, particularly on the tires of the back wheel set 24.

Thus, there is provided a fire-fighting vehicle, and particularly an airport rescue, fire-fighting vehicle including a mechanical steering apparatus and having a tilt-bed capability of at least 30°. One of the embodiments illustrated in the figures and described above, are presently preferred, but it should be understood that these embodiments are offered by way of example only. The invention is not intended to be limited to any particular embodiment but is intended to extend to various modifications that nevertheless fall within the scope of the appended claims. Additional modifications will be evident to those with ordinary skill in the art.

What is claimed is:

1. An airport rescue fire fighting vehicle comprising;

a support structure coupled to at least three wheel sets, and having a front end and a back end, wherein one of the wheel sets is coupled to the front end of the support structure and one wheel set is coupled to the back end of the support structure;

a power source mounted on the support structure and coupled to at least one wheel set;

a modular independent suspension coupled to each wheel; and a mechanical steering apparatus coupled to the front wheel set and at least one rear wheel set, with the mechanical steering apparatus configured to proportionately move the rear wheel set in linked relationship to the movement of the front wheel set to minimize tire scrub on the rear wheel set, wherein the mechanical steering apparatus includes:

a steering wheel;

a first parallel shaft gear box coupled to the steering wheel, a front master/slave steering gear set and an elongated rotary shaft; and a second parallel shaft gear box coupled to the elongated rotary shaft and coupled to a back master/slave steering gear set, wherein the front master/slave steering gear set is coupled to the front wheel set and the back master/slave steering gear set is coupled to the rear wheel set so that when the front wheel set is turned in one direction the rear wheel set will turn in a proportional opposite direction in response to the steering wheel movement.

2. The airport rescue fire fighting vehicle of claim 1, including a cab and a vehicle body mounted on the support structure.

3. The airport rescue fire fighting vehicle of claim 2, wherein the cab is mounted at the front end of the support structure and the power source is mounted at the back end of the support structure.

4. The airport rescue fire fighting vehicle of claim 2, wherein the overall width of the cab and vehicle body does not exceed 120 inches.

5. The airport rescue fire fighting vehicle of claim 4, wherein the vehicle has a tilt-table capability of more than 30° with fully fire fighting fluid tanks.

6. The airport rescue fire fighting vehicle of claim 1, wherein each master/slave steering gear set includes a tie rod.

7. The airport rescue fire fighting vehicle of claim 1, wherein the elongated rotary shaft is segmented.

8. The airport rescue fire-fighting vehicle of claim 1, including an intermediate wheel set coupled to the support structure.

9. A mechanical steering apparatus for an airport rescue fire fighting vehicle having a front wheel set, and at least two wheel sets and a modular independent suspension coupled to each wheel of each wheel set, the mechanical steering apparatus comprising:

a steering wheel mounted on the vehicle;

a first parallel shaft gear box coupled to the steering wheel, a front master/slave steering gear set and an elongated rotary shaft; and a second parallel shaft gear box coupled to the elongated rotary shaft and coupled to a back master/slave steering gear set, wherein the front master/slave steering gear set is coupled to the front wheel set and the back master/slave steering gear set is coupled to one of the rear wheel sets so that when the front wheel set is turned in one direction the rear wheel set will turn in a proportional opposite direction in response to the steering wheel movement, and minimize tire scrub on the rear wheel set.

10. The mechanical steering apparatus of claim 9, wherein each master/slave steering gear set includes a tie rod.

11. The mechanical steering apparatus of claim 9, wherein the elongated rotary shaft is segmented.

12. The mechanical steering apparatus of claim 9, including an intermediate wheel set.

13. A fire fighting vehicle comprising:

a means for supporting coupled to at least three wheel sets, and having a front end and a back end, wherein one wheel set is coupled to the front end of the means for supporting and one wheel set is coupled to the back end of the means for supporting;

a means for powering mounted on the means for supporting and coupled to at least one wheel set;

a modular independent suspension coupled to each wheel; and a means for mechanically steering coupled to the front wheel set and at least one rear wheel set, with the means for mechanically steering configured to minimize tire scrub on the rear wheel set, wherein the means for mechanically steering includes:

a means for steering;

a first means for transferring torque coupled to the means for steering, a front means for wheel steering and an elongated rotary shaft; and a second means for transferring torque coupled to the elongated rotary shaft and coupled to a back means for wheel steering, wherein the front means for wheel steering is coupled to the front wheel set and the back means for wheel steering is coupled to the rear wheel set so that when the front wheel set is turned in one direction the rear wheel set will turn in a proportional opposite direction in response to the means for steering movement.

14. The fire fighting vehicle of claim 13, including a cab and a means for shrouding mounted on the means for supporting.

15. The fire fighting vehicle of claim 14, wherein the cab is mounted at the front end of the means for supporting and the means for powering is mounted at the back end of the means for supporting.

16. The fire fighting vehicle of claim 14, wherein the overall width of the cab and means for supporting does not exceed 120 inches.

17. The fire fighting vehicle of claim 16, wherein the vehicle has a tilt-table capability of more than 30° with fully loaded fire fighting fluid tanks.

18. Fire fighting vehicle of claim 13, wherein each means for wheel steering includes a means for connecting.

19. The fire fighting vehicle of claim 13, wherein the elongated rotary shaft is segmented.

20. The fire-fighting vehicle of claim 13, including an intermediate wheel set coupled to the means for supporting.

21. The fire fighting vehicle of claim 13, wherein the vehicle is configured as an airport rescue crash truck.

* * * * *